United States Patent [19]

La Franca

[11] 4,394,770

[45] Jul. 19, 1983

[54] X-RAY FILM PACKAGE AND METHOD AND APPARATUS FOR MAKING THE SAME

[76] Inventor: Peter J. La Franca, 719 Cunningham St., Rockford, Ill. 61102

[21] Appl. No.: 278,739

[22] Filed: Jun. 29, 1981

[51] Int. Cl.[3] ........................ G03B 41/16; G03C 5/16

[52] U.S. Cl. .................................... 378/169; 378/164; 430/396; 430/967

[58] Field of Search ............... 378/164, 166, 163, 169, 378/63; 250/561; 430/396, 966, 967

[56] References Cited

U.S. PATENT DOCUMENTS

| | | | |
|---|---|---|---|
| 2,614,225 | 10/1952 | Shapiro | 378/169 |
| 3,514,606 | 5/1970 | Rabey | 378/164 |
| 3,848,136 | 11/1974 | Seldin | 378/169 |

OTHER PUBLICATIONS

Fixott, H. C. et al., "Use of a Grid in the Diagnosis of Oral Roentgenograms", *Jour. of American Dental Association,* vol. 78, No. 1, Jan. 1969, pp. 122–123.

*Primary Examiner*—Alfred E. Smith
*Assistant Examiner*—T. N. Grigsby
*Attorney, Agent, or Firm*—Leydig, Voit, Osann, Mayer & Holt, Ltd.

[57] ABSTRACT

An X-ray package for X-raying an object such as a portion of a human body includes a film which has been pre-exposed to dimensional indicia so that, after the package has been exposed to X-radiation relative to the object and the film has been developed, the image on the film includes both the object and the dimensional indicia. The package is made by unwinding a roll of pre-exposed film while simultaneously unwinding rolls of cover materials to form a composite strip of film and cover materials and forming X-ray packages successively from the end of the composite strip. The film is pre-exposed by unwinding a roll of unexposed film while simultaneously unwinding a control strip and the control strip causes the film to advance in steps of precisely equal lengths. Between each advance of the strips, a portion of the strip of film is exposed to dimensional indicia.

11 Claims, 16 Drawing Figures

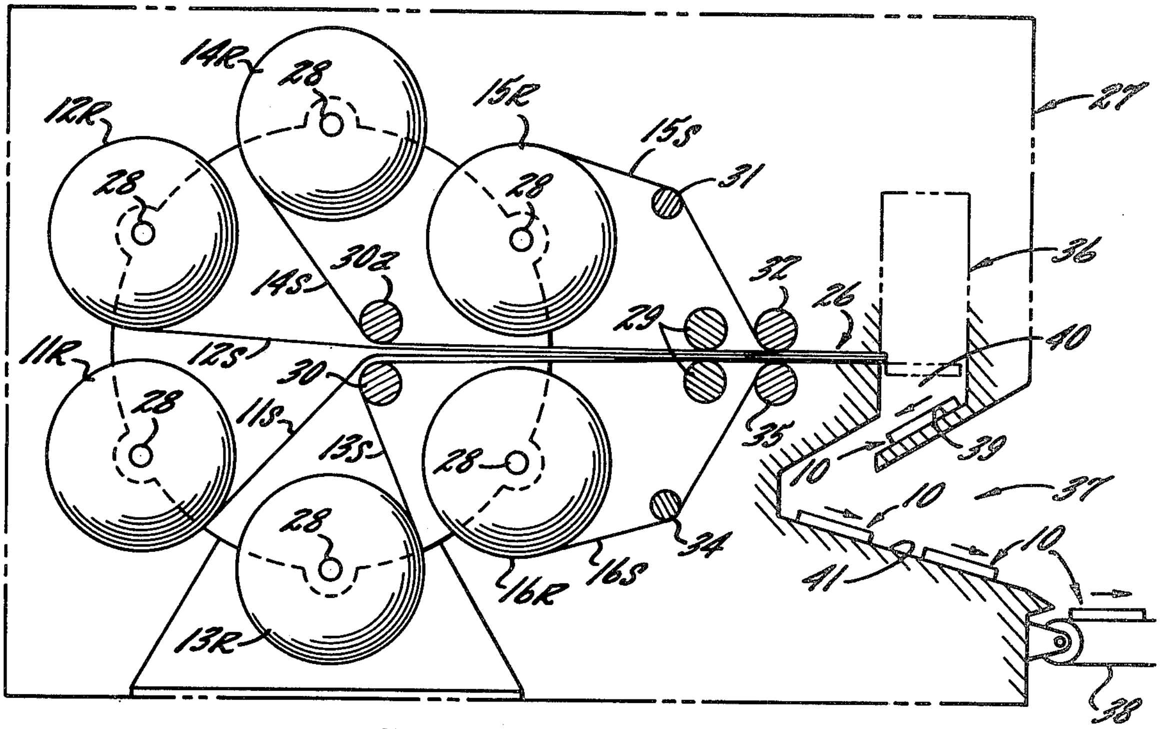
Fig. 1.
Fig. 2.
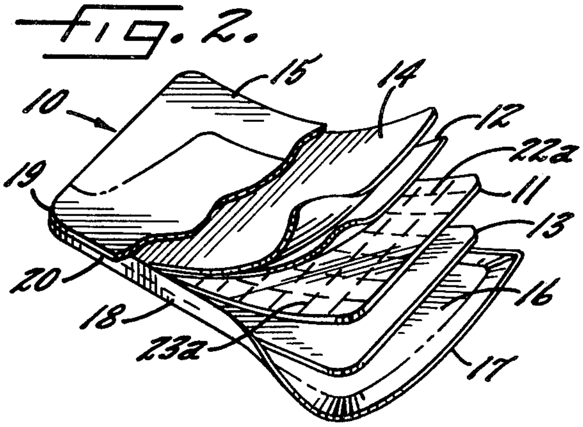
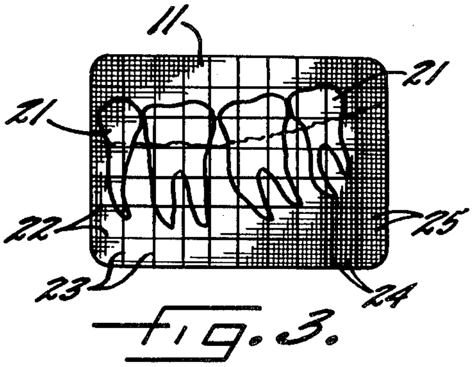
Fig. 3.
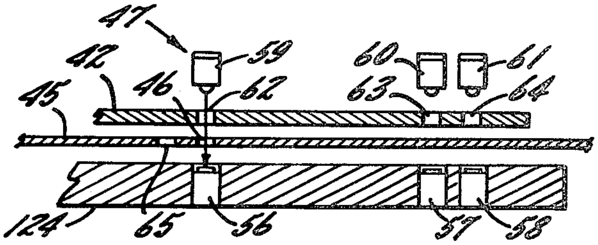
Fig. 5a.
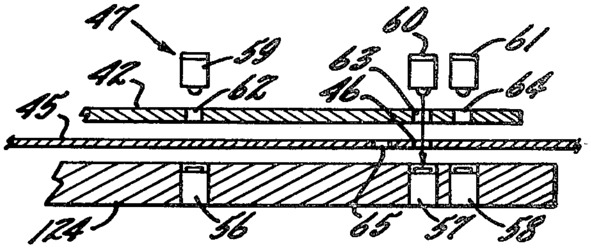
Fig. 5b.
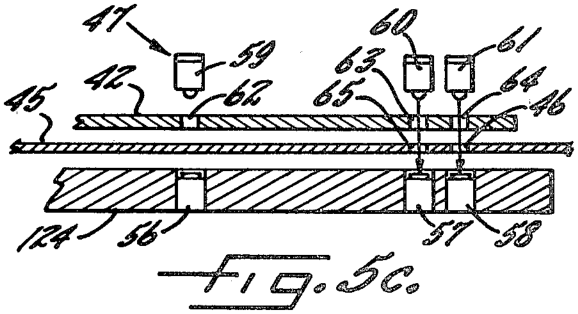
Fig. 5c.

X-RAY FILM PACKAGE AND METHOD AND APPARATUS FOR MAKING THE SAME

BACKGROUND OF THE INVENTION

This invention relates to an X-ray film package and, more particularly, to a package in which the film, after being exposed to X-radiation in conjunction with an object such as a part of a human body and then is developed, produces an image on the film of both the object and dimensional indicia. A dental X-ray package of this general type is disclosed in Seldin U.S. Pat. No. 3,848,136. Previously, such packages include a film and a separate sheet bearing the dimensional indicia but such packages have a number of drawbacks including the ease of automatic assembly and distortion of the dimensional indicia relative to the object as they appear on the developed film.

SUMMARY OF THE INVENTION

The general object of the invention is to provide a new and improved X-ray package of the foregoing type which essentially eliminates any distortion of the dimensional indicia relative to the object and is capable of being produced on high-speed automatic equipment.

A more detailed object is to accomplish the foregoing by pre-exposing the film to the dimensional indicia before the package is subjected to X-radiation and before the film is developed so that, prior to being developed, the film has been exposed both to the indicia and to the object under virtually the same conditions and the inclusion of an indicia-bearing sheet is eliminated from the package.

In another of its aspect, the invention contemplates a method of making such a package which method is readily adaptable to conventional high-speed automatic packaging machinery.

Another object is to provide a novel apparatus for automatically pre-exposing a roll of undeveloped X-ray film to the dimensional indicia which apparatus advances and pre-exposes the film step by step and the advance of the film through each step is precisely controlled so that there are no irregularities along the film in the pre-exposure with the result that the pre-exposed indicia on the roll is the same as if the entire roll had been pre-exposed in a single exposure.

The invention also resides in the novel construction and arrangement of the pre-exposing apparatus.

BRIEF DESCRIPTION OF THE DRAWINGS

FIG. 1 is a schematic longitudinal perspective view of a packaging machine suitable for performing the method of making an X-ray package in accordance with the present invention.

FIG. 2 is a perspective view of an X-ray package embodying the present invention, the sheets of the package being leafed out for clarity of explanation.

FIG. 3 is a plan view of a film as used in the package and after having been developed.

FIG. 5*a* is a fragmentary sectional view taken along the line 5*a*–5*a* in FIG. 5.

FIG. 5*b* is a view similar to FIG. 5*a* but with the parts in a moved position.

FIG. 5*c* is a view similar to FIG. 5*b* but with the parts in a still further moved position.

DETAILED DESCRIPTION OF THE PREFERRED EMBODIMENT

Figure 4:
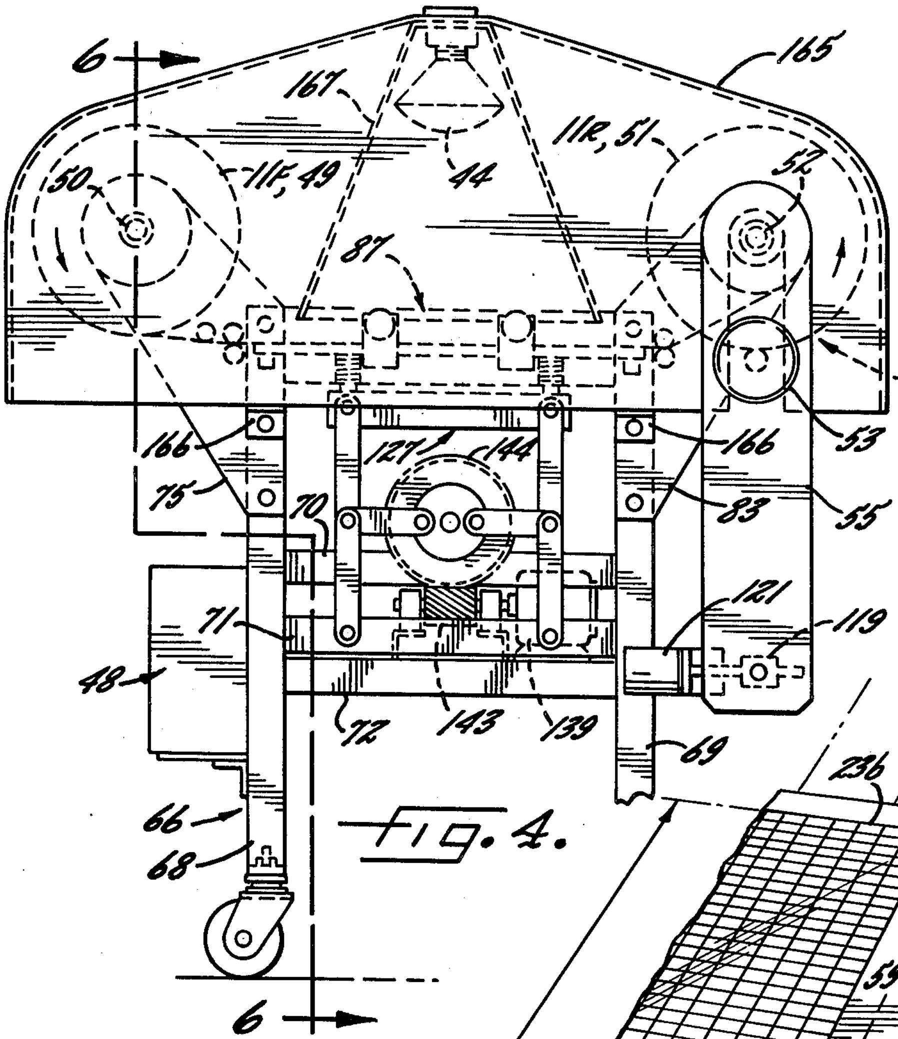
FIG. 4 is a side elevational view of the novel apparatus for pre-exposing the film.

As shown in the drawings for purposes of illustration, the invention relates to an X-ray film package such, for example, as the package 10 shown in FIG. 2 which is of the type used to X-ray teeth. The package includes a sheet 11 of X-ray film, two opaque black insert sheets 12 and 13 on opposite sides of the film, a lead sheet 14 outside the black insert 12 and two paper cover sheets 15 and 16. The bottom cover sheet 16 has end and side margins 17 and 18 which are folded up and over the lead sheet and the top cover sheet has similar margins 19 and 20 which are folded down to overlap the margins 17 and 18 thereby to enclose the stack of the other sheets. The margins 19 and 20 are sealed to the margins 17 and 18 to complete the package.

In one of its aspects, the present invention contemplates the provision of a novel X-ray package 10 which, when the film 11 is developed, produces an image not only of the object being X-rayed but also an image of precisely defined dimensional measuring indicia. In the case of a dental X-ray package, FIG. 3 is illustrative of the film as developed with the film having images of teeth 21 superimposed with a grid of lines. The grid may include major longitudinal lines 22 spaced apart a preselected distance, such as five centimeters and major transverse lines 23 preferably spaced apart the same distance as the lines 22. In addition, finer longitudinal and transverse lines 24 and 25 may divide the spaces between the major lines into smaller units such as units of one centimeter. In this way, the location of one point on the object which was X-rayed to another point may be accurately determined. To prevent distortion of the lines 22, 23, 24 and 25 relative to each other and relative to the object being X-rayed, the film 11 in the package 10 of the present invention has a pre-exposed grid which, although not visible until the film is developed, is represented by the broken lines **22*a* and 23*a* in FIG. 2**. Thus, before the film is packaged, it is subjected to a light source which exposes the film only to the grid lines but these lines do not become visible until after the package subsequently has been subjected to X-radiation and the film is developed. With the grid in effect being an integral part of the film, the indicia and the object being X-rayed are exposed under substantially identical conditions and thus the possibility of distortion is eliminated.

In another of its aspects, the invention also relates to a novel method of producing the package 10. Basically, the method comprises the steps of taking an unexposed X-ray film 11 and exposing the film to dimensional indicia such as the indicia 22 through 25 and then, without further exposing the film and without developing the film, placing the latter in a cover which completely shields the film from normal light but permits the film to be exposed to X-radiation. Normally, the cover includes the back insert sheets 12 and 13, the lead sheet 14 and the cover sheets 15 and 16. For high-speed production, the method contemplates in its more detailed aspects the steps of pre-exposing an entire supply roll 11R of film material (FIG. 1) and then coordinating this roll with supply rolls 12R and 13R of black insert material, a supply roll 14R of lead sheet material and supply rolls 15R and 16R of cover material so that material is drawn from all the rolls simultaneously to form an elongated composite strip 26 of the sheets with the strips layered in the same order as in the final package 10. Packages then are made by successively cutting off the end portion of the strip in lengths substantially equal to the package and then sealing the cover sheets 15 and 16 together to complete the package.

Any of the suitable packaging machines well-known in the art may be used to form the packages 10 from the supply rolls 11R through 16R and, accordingly, such a machine is shown only schematically in FIG. 1. Thus, the machine includes basically a light-proof enclosure 27 in which the supply rolls are mounted to turn on parallel arbors 28. The roll 11R of pre-exposed film is located near the back of the enclosure and the black insert roll 13R is disposed beneath and slightly forward of the film roll. Sheets 11S and 13S from these rolls are trained over an idler roller 30 with the film sheet on the top of the black insert sheet and then these sheets pass between drive rollers 29 which, when driven, draw the sheets from their respective rolls. The other black insert roll 12R is above the film roll and the roll 14R of lead insert material is above and slightly forward of the roll 12R. Sheets 12S and 14S drawn from the rolls 12R and 14R are trained around another idler roller 30*a* with the lead sheet 14S being above the black insert sheet 12S and then these two sheets pass between the drive rollers 29 with the sheets 11S and 13S. It will be observed that, as the sheets 11S, 12S, 13S and 14S pass between drive rollers, they are stacked in the same order as are the sheets 11, 12, 13 and 14 of the final package.

The supply rolls 15R and 16R of the material for the top and bottom cover sheets 15 and 16 are disposed forwardly of rolls 14R and 13R and are located respectively above and below the sheets 14S, 12S, 11S and 13S as the latter pass from the idler rollers 30 to the drive rollers 29. The sheet 15S drawn from the roll 15R passes over an idler roller 31 and then between drive roller 32 so that, when the roller 32 is driven, the sheet is drawn from the roll. Similarly, the sheet 16S is drawn from the roll 16R and under an idler roller 34 by a drive roller 35 coacting with the roller 32. Thus, the six sheets 11S, 12S, 13S, 14S, 15S and 16S form the strip 26 which is fed to a packaging apparatus shown schematically at 36 with the sheets being layered in the same order as the sheets of the package 10. The widths of the sheets drawn from the supply rolls are the same as the widths of the corresponding sheets of the package and the speeds of the drive rollers 29, 32 and 35 are synchronized so that the cover sheets 15S and 16S are drawn slightly faster than the other sheets to provide for the end margins 19 and 17 on the cover sheets of the package.

The packaging apparatus 36 includes well-known mechanisms (not shown) which successively sever end portions from the strip 26 of the sheets 11S, 12S, 13S, 14S, 15S and and 16S, fold the margins 17 and 18 of the bottom cover sheet 16 and the margins 19 and 26 of the top cover sheet 15, and seal the margins 19 and 20 to the margins 17 and 18 thereby to complete the formation of the packages 10. The latter are delivered through a light trap, shown schematically at 37, to a conveyor 38 for subsequent handling. Herein, the light trap basically includes a first ramp 39 which extends inwardly and downwardly and projects under and beyond the outlet opening 40 of the packaging apparatus so that the finished packages drop onto the ramp. The packages slide down the ramp by gravity and drop onto a second ramp 41 which extends downwardly and outwardly to a point over the conveyor 38. Thus, the packages slide down the ramp 41 and onto the conveyor.

An important aspect of the invention resides in the novel apparatus for precisely and automatically pre-exposing the film for the supply roll 11R to the dimensional indicia 22 through 25. In general, this apparatus includes an opaque plate 42 (FIG. 5) with a portion 43 having light-transmitting lines 22*b* through 25*b* corresponding to the dimensional indicating lines on the pre-exposed film 11. A length of totally unexposed film 11U is drawn off a supply roll 11F (FIG. 8) by a drive mechanism and placed against one side of the plate 42 and then a light source 44 (FIG. 4) is activated to expose this length of film to the light only along the light-transmitting lines in the plate portion 43. Next, the light source is deactivated and the film is indexed precisely so that the pre-exposed lines 23*a* at the trailing edge of this length of film are exactly correlated with the lines 23*b* at the far end of the plate and a new length of unexposed film is disposed against the plate and exposed to the light source. The process is repeated until the entire roll 11F has been pre-exposed, the pre-exposed film being wound on a take-up roll which becomes the supply roll 11R (see FIG. 8). Although the film is pre-exposed in a step-by-step manner, the precision by which the film is indexed produces accurately spaced indicia which are uninterrupted from one end of the film to the other. As a result, no package 10 will be formed with inaccurate or distorted indicia.

To achieve the precise indexing of the unexposed film 11U, a control strip 45 is moved in unison with the film by the drive mechanism and is formed with longitudinally spaced targets 46 (FIG. 5) with the distance between adjacent targets being exactly the same as the length l of that portion 43 of the plate 42 which has the indicia 22*b* through 25*b*. Sensing means 47 located adjacent the control strip 45 senses a target and, through suitable control logic circuits 48 shown schematically in FIG. 13 (hereinafter called the "control"), stops the drive mechanism to precisely locate the strip and the film and initiates the pre-exposing cycle. When that cycle has been completed, the control restarts the drive mechanism to advance the control strip and the film until the sensing means senses the next target 46 and stops the drive mechanism, the strip and the film then having been advanced exactly the distance l. The control 48 then initiates the pre-exposing cycle again after which it restarts the drive mechanism and this is repeated until the roll 11F of unexposed film has been pre-exposed and wound to form the roll 11R. Although the control strip 45 may be a part of the film 11U and later trimmed off, it is preferred that the control strip be separate so that it can be reused and also so that it can control the advance of more than one film at a time. In the illustrated embodiment, for example, three rolls 11F of film are pre-exposed at a time (see FIGS. 6 and 8).

Figure 5:
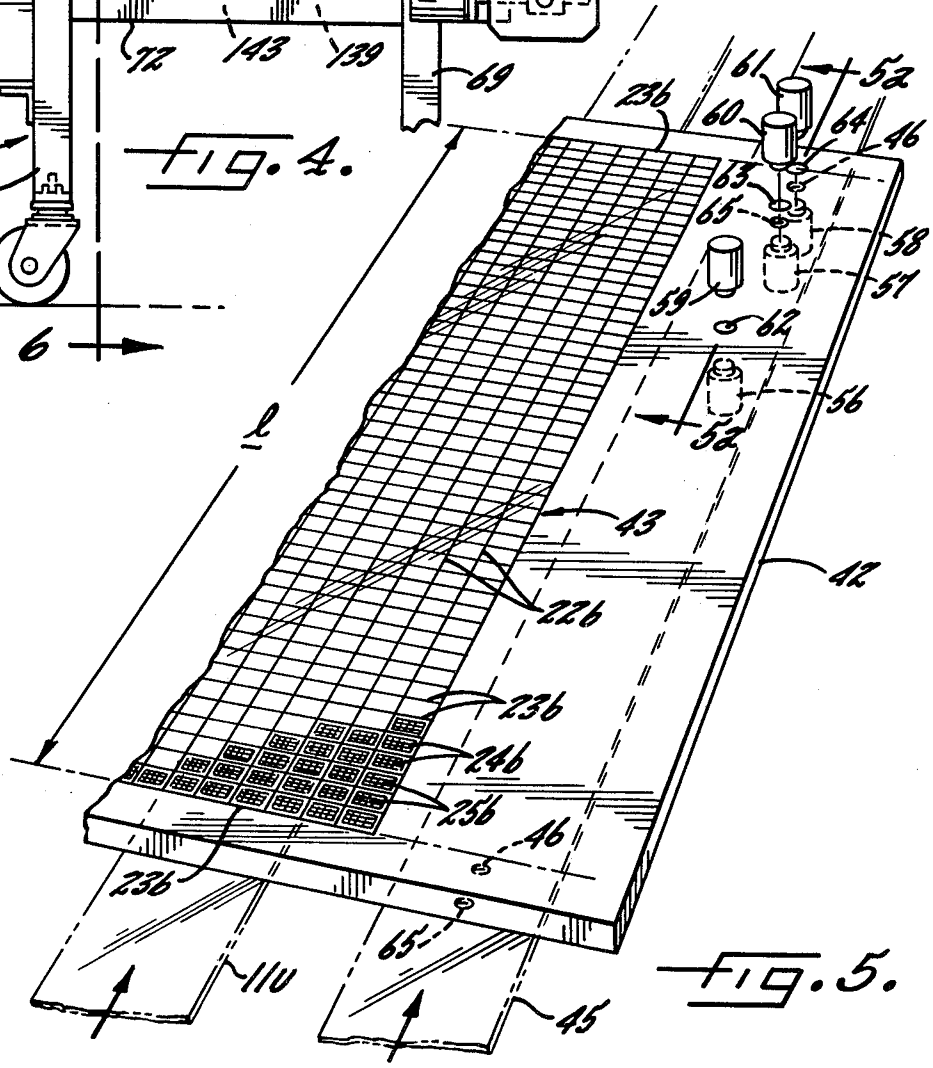
FIG. 5 is a fragmentary perspective view of a portion of the pre-exposing apparatus including a part of the means which effects the precise advance of the strip.
Figure 7:
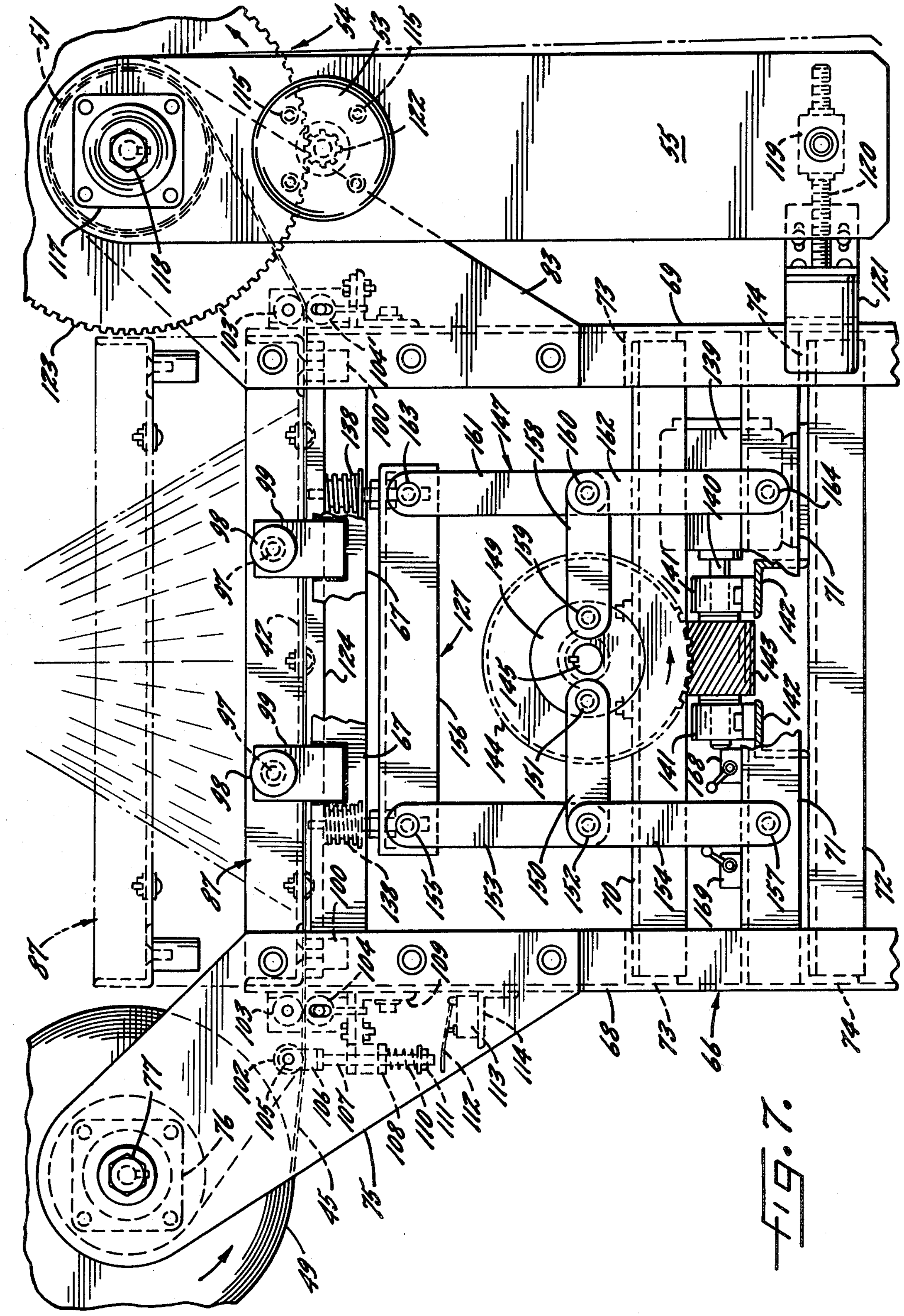
FIG. 7 is a fragmentary sectional view taken along the line 7—7 in FIG. 6.
Figures 8, 9, 10:
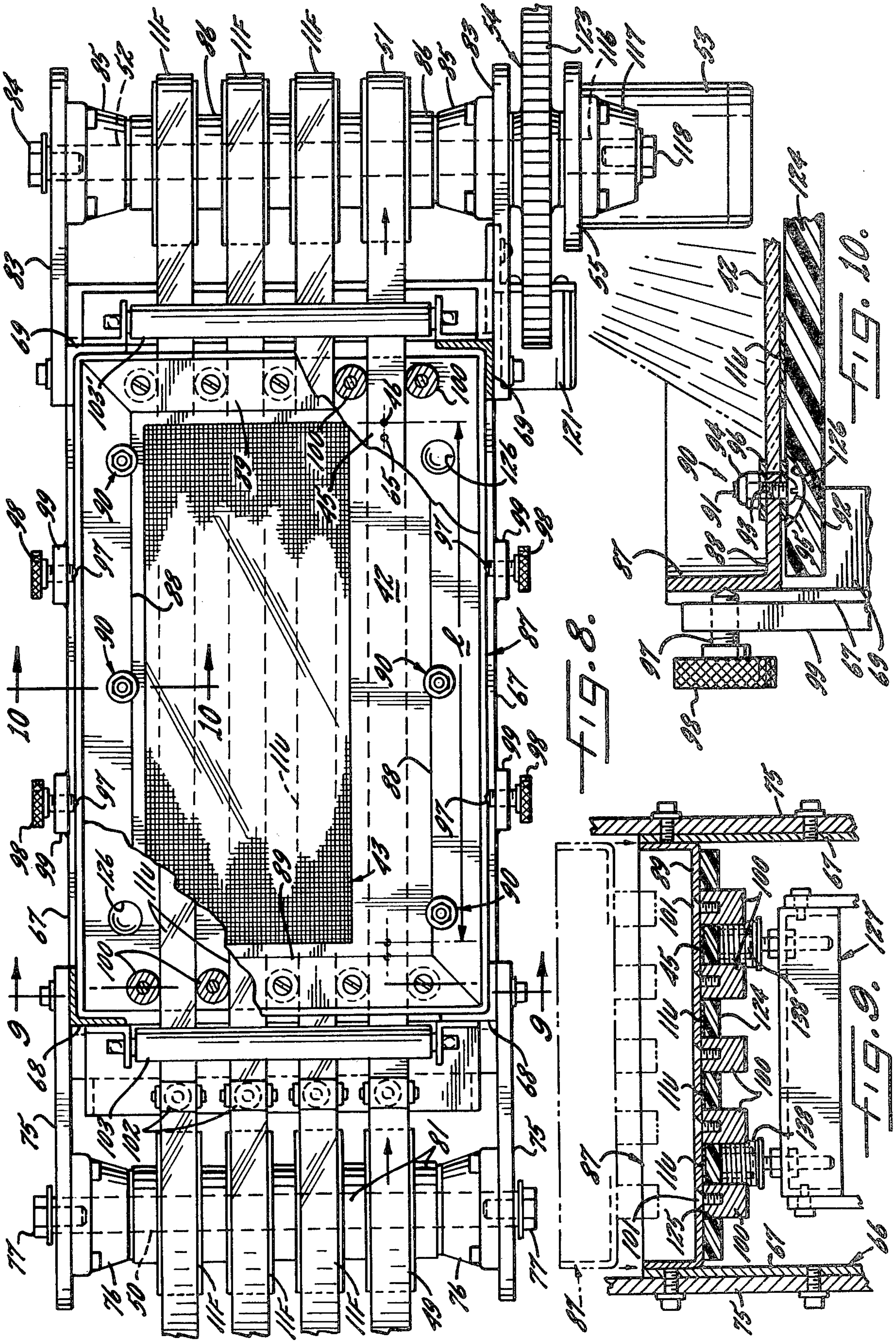
FIG. 8 is a top plan view of the pre-exposing apparatus, parts being broken away and shown in section.
FIG. 9 is a fragmentary sectional view taken along the line 9—9 in FIG. 8.
FIG. 10 is an enlarged fragmentary sectional view taken along the line 10—10 in FIG. 8.

As shown in FIGS. 4, 7 and 8, the supply roll 49 of the control strip 45 and the rolls 11F of unexposed film are supported on a horizontal shaft 50 at one end of the pre-exposing apparatus and the strips from these rolls pass under the plate 42 to their respective take-up rolls 51 and 11R which are mounted on a second horizontal shaft 52 at the other end of the apparatus. The strips of film 11U pass under the portion 43 of the plate 42 with the indicia 22*b* through 25*b* and the control strip 45 passes under an opaque part of the plate next to the portion 43. Herein, the drive mechanism for advancing the film and the control strip is composed of two drive subassemblies, one being a two-speed motor 53 which turns the shaft 52 through a gear train 54 and the other being a power-driven compensating arm 55 which swings to turn the shaft 52 independently of the motor. When this arrangement, the control strip and the film are advanced in three stages under the control of the sensing means 47. Thus, the first stage produces the advance of the major portion of the distance l and is at a relatively high speed, this being effected by operating the motor 53 at its higher speed. At the end of the first stage, the sensing means 47, through the control 48, causes the motor to operate at its slower speed until the motor is deenergized under the control of the sensing means at which time the advance of the strips is still somewhat short of the distance l. The inertia of the motor 53, the gear train 54 and the associated parts causes the strips to move slightly further although still short of full length l of travel, this completing the second stage. The sensing means 47, again through the control 48, then initiates the third stage which is effected by turning the compensating arm 55. The latter turns the shaft 52 very slowly until the strips have advanced exactly the distance l at which time the sensing means is effective to stop the arm.

The inertia effect at the end of the second stage causes the shaft 52 to turn about the same number of degrees whether the take-up rolls 11R and 51 are almost empty or almost full. Because of the increasing diameter of the take-up rolls, however, the advance of the control strip 45 and the film 11U increases progressively during the pre-exposing operation. In all cases, however, the inertia results in the strip and the film stopping short of their final position and whatever distance of advance is left is accomplished by the compensating arm 55.

In the present instance, the sensing means 47 includes three photoelectric cells 56, 57 and 58 (see FIGS. 5, 5*a*, 5*b* and 5*c*) disposed beneath the control strip 45 and three light sources 59, 60 and 61 disposed above the plate 42 and the control strip and coacting respectively with the photoelectric cells. Holes 62, 63 and 64 are formed in the plate 42 beneath the light sources to permit light from the latter to be transmitted through the plate. Herein, the targets 46 are holes which are punched in the control strip and which, when they are alined with one of the photoelectric cells, permit the passage of light from the associated source to the cell, the strip being otherwise opaque.

The photoelectric cell 56 is located so that a hole 46 registers with it when the control strip 45 and the film 11U have been advanced by the motor 53 at its higher speed to position about two inches short of their total advance l. This energizes the cell 56 which, through the control 48, reduces the speed of the motor 53 to its lower speed. The motor then advances the strip and the film at slow speed until the hole registers with the photoelectric cell 57 at which time the strip and film are about one-eighth of an inch short of the desired total advance. At this time, the cell 57 stops the motor and activates the drive of the compensating arm 55 which then advances the strip and the film very slowly until the hole 46 registers with photoelectric cell 58. The latter is effective to stop the drive of the compensating arm and, at this time, the control strip and the film have been advanced precisely the distance l.

Herein, the sensing means 47 also is used to initiate the pre-exposing cycle after the advance of the control strip 45 and the film 11U has been completed. As will be explained more in detail, this cycle may include clamping the film to the plate 42, exposing the film to the light source 44 above the plate, unclamping the film, and restarting the motor 53 at high speed. To initiate the cycle, a second target hole 65 is formed in the control strip just behind each target hole 46 and the spacing between each pair of holes 46 and 65 is exactly equal to the spacing between the photoelectric cell 57 and 58. As a result, when the hole 46 is registered with the cell 58, the hole 65 registers with the cell 57 (see FIG. 5*c*) and both cells are energized simultaneously. In this condition, the two cells act together to cause the control 48 to produce the pre-exposing cycle.

Figure 6:
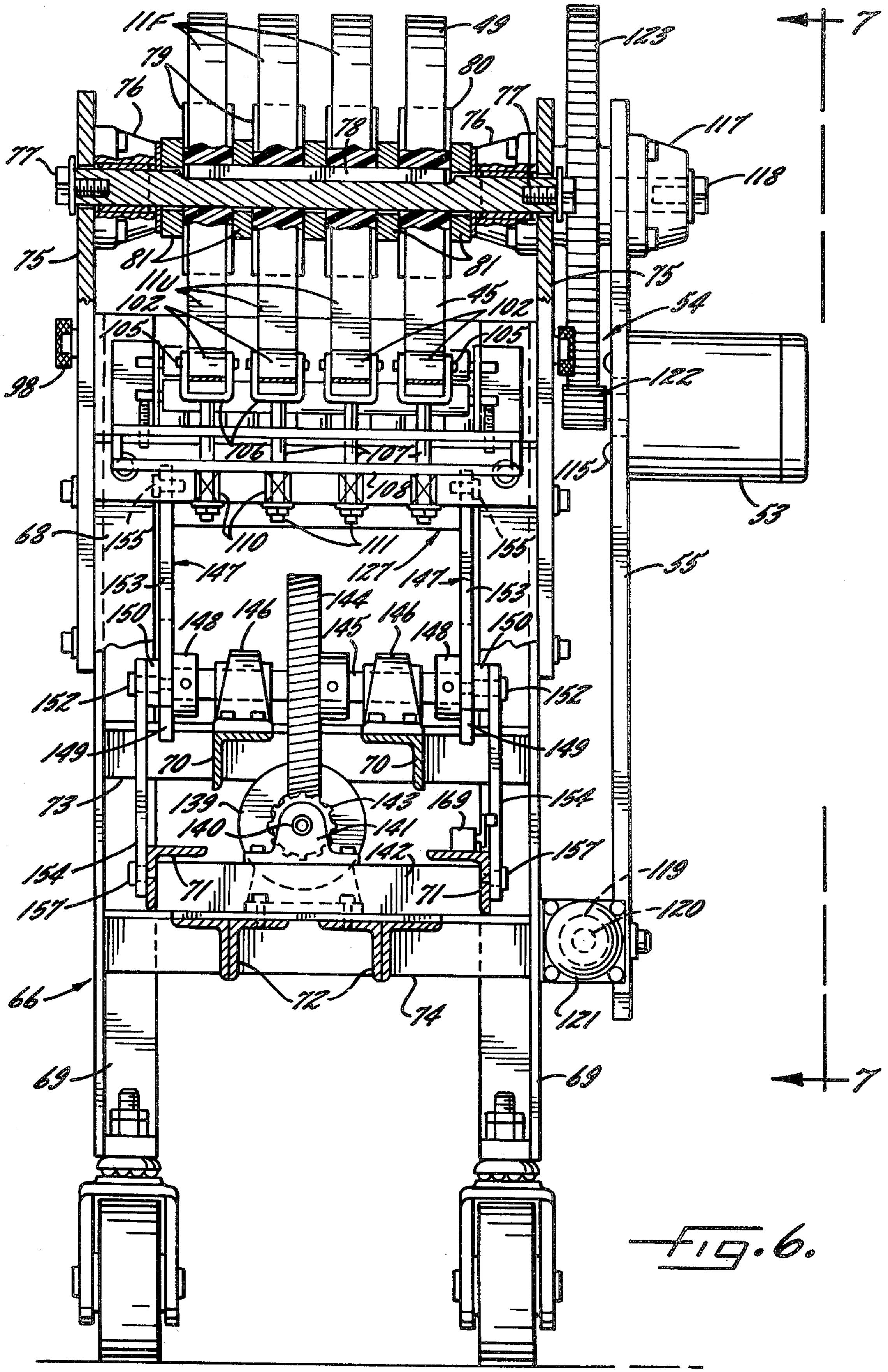
FIG. 6 is an enlarged sectional view taken along the line 6—6 in FIG. 4.

The various components of the pre-exposing apparatus are supported on a wheeled base 66 having spaced horizontal side bars 67 (FIG. 7) spanning and welded to front and rear legs 68 and 69 adjacent the top thereof, the legs being made of angle irons as shown in FIG. 6 and 8. The base also includes angle irons 70, 71 and 72 spanning the front and rear legs at points spaced beneath the bars 67 and pairs of transverse angle irons 73 and 74 (FIG. 6) which span the front legs 68 and the rear legs 69. Spaced arms 75 are bolted to the front legs and project forwardly and upwardly to support the shaft 50 which carries the supply rolls 49 and 11F of the control strip 45 and the film 11U. The shaft 50 is journaled in bearing blocks 76 (FIG. 6) secured to the arms and is removably held in place by screws 77. By means of an elongated key 78 projecting into a slot in the shaft and into slots in the hubs 79 and 80 of the supply rolls 11F and 49, the latter turn with the shaft and the supply rolls are held in proper position on the shaft by spacers 81. Similar arms 83 are bolted to the rear legs 69 and project rearwardly and upwardly to support the shaft 52 which carries the take-up rolls 11R and 51. The shaft 51 is removably held on the arms by a screw 84 (FIG. 8) and, like the shaft 50, is journaled in bearing blocks 85. Also, the take-up rolls are keyed to the shaft 51 and held in place by spacers 86.

The plate 42 is supported on the base 66 by the bars 67 and is arranged to be removable so that, if desired, it may be replaced with a plate bearing different indicia. For this purpose, the plate is carried by a metal box-like frame 87 (FIGS. 8 and 10) with flanges 88 and 89 projecting in from the lower edges of all sides of the frame. The plate 42 is disposed in the rectangular space defined by the flanges and is fastened to the flanges 88 by a series of fastener assemblies 90 spaced along the sides of the plate. As shown most clearly in FIG. 10, each fastener assembly includes a bolt 91 with a rounded head 92 projecting up through a hole 93 in one of the flanges 88 and receiving a nut 94 on the upper side of the flange. Between the head 92 and the flange is a comparatively stiff rubber washer 95 and a similar washer 96 is disposed between the nut and the flange. The washers overlap the edge of the plate 42 and hold the latter in place between the flanges 88 and 89 of the frame 87 when the bolt 91 and nut 94 are tightened. The fastener assemblies 90 being removable, the plate 42 may be removed from the frame and replaced with another plate.

With the plate 42 in place in the frame 87, the latter is lowered into the upper part of the base 66 (see the broken and solid line positions in FIG. 9). The frame is positioned in its vertical location on the base and, as shown in FIG. 8, the corners of the frame are received within the angle-iron legs 68 and 69. Once positioned, the frame 87 is held in place by set screws 97 (FIGS. 7, 8 and 10) which are formed with finger pieces 98 and are threaded through ears 99 welded to and upstanding from the side bars 67 of the base, the points of the set screws bearing against the sides of the frame 87. As illustrated in FIGS. 8 and 9, five spaced guide rolls 100 project down from each of the flanges 89 of the frame 87 and are secured to the flanges by screws 101. The spacing between adjacent rolls 100 closely matches the widths of the control strip 45 and the film 11U so that the rolls accurately guide the strips and the film as they are advanced along the underside of the plate 42.

As the control strip 45 is unwound from its supply roll 49, it passes under a spring-biased dancer roller 102, then between two elongated idler rollers 103 and 104 and then between two of the guide rolls 100 to the underside of the plate 42 (see FIGS. 6, 7 and 8). The dancer roller takes up any slack in the control strip and is journaled by a pin 105 in a U-shaped bracket 106 which is carried on the upper end of an upright rod 107. The latter slides vertically in a guide 108 bolted to a bracket 109 which is welded to the front legs 68 of the base 66. A coiled compression spring 110 encircling the rod 107 and acting between the guide 108 and an enlargement 111 on the lower end of the rod continuously exerts a downwardly directed yieldable force on the dancer roller 102. As shown in FIG. 6, strips of film 11U also pass under individual dancer rolls which are identical to the dancer roller 102 and the parts of which are identified by the same reference characters. The strips of film then pass between the idler rollers 103 and 104 and then through individual spaces between the guide rolls 100. The idler rollers may conveniently be mounted on the same bracket 109 as the dancer rollers (see FIG. 7). If there is too much slack in the control strip 45 or one of the film strips 11U or if one of these strips breaks, the rod 107 of the corresponding dancer roll will drop down and engage the actuating arm 112 of a switch 113 mounted on a bracket 114 on the legs 68 and, through the control 48, the switch will stop the pre-exposing apparatus. As stated earlier, the control strip 45 and the strips of film 11U pass beneath the plate 42, between the guide rolls 100 and the rear of the plate and onto take-up rolls 51 and 11R. Between the guide rolls and the take-up rolls, each strip passes between a second pair of idler rollers 103' and 104' which are similar to the idler rollers 103 and 104 and the associated parts are indicated by the same but primed reference characters.

In the present instance, the drive motor 53 and the compensating arm 55 are integrated in the construction of the drive mechanism for advancing the control strip 45 and the strips of film 11U. Thus, the motor is mounted by bolts 115 on the arm which is stationary while the motor is energized and then, while the arm is being driven, the motor is de-energized. Herein, the compensating arm is generally vertical and its upper end is journaled on an extension 116 of the shaft 52 by means of a bearing assembly 117 secured to the shaft by a screw 118 (FIG. 8). Fixed to the arm adjacent the lower end thereof is a nonrotatable nut 119 which receives a screw 120 formed on the output shaft of a reversible motor 121 used for turning the arm 55, the motor 121 being mounted on one of the rear legs 69 of the base 66. With this arrangement, the compensating arm 55 and hence the drive motor 53 are stationary relative to the base 66 when the motor 121 is not energized and, in this condition, the drive motor 53 directly turns the shaft 52 through the gear train 54 which comprises a pinion 122 fast on the output of the motor 53 and meshing with a spur gear 123 keyed to the shaft 52. When the drive motor 53 has advanced the strips through the first and second stages as described above, it is de-energized and the arm motor 121 is energized. Because of the threaded connection of the screw 120 and the nut 119, this turns the compensating arm counterclockwise as viewed in FIG. 7 and, because the pinion 122 is not turning relative to the arm at this time, it turns the gear 123 and hence the shaft 52 until the strips 45 and 11U have completed the third stage of their advance, the arm then having swung to a position such as that shown in broken lines in FIG. 7. As a part of the cycle effected by the control 48 after the full advance of the control strip 45 and the film 11U, the motor 121 is reversed to return the compensating arm back to its original position illustrated in full lines in FIG. 7, this occurring just before the drive motor 53 is restarted.

Means is provided to hold the strips of film 11U either against or very close to the underside of plate 42 while the film is being pre-exposed to the light source 44. While this means may take various forms including stationary channels which continuously hold the film in position for exposure, in the illustrated embodiment it is a vertically movable pressure plate 124 (FIGS. 7 and 9–12) which, each time after the control strip 45 and the film 11U have been advanced the distance l, is moved up to resiliently clamp the film against the underside of the plate 42. Then, after the film has been exposed by the light source 44, the pressure plate is lowered to permit the next advance of the strips, the raising and lowering of the pressure plate taking place at the proper times in the pre-exposing cycle as effected by the control 48. Adjacent its front and rear ends, the pressure plate is formed with holes 125 (FIGS. 9 and 11) which receive the guide rolls 100 and, thus, the latter serve the additional function of guiding the vertical movement of the pressure plate. Also, recesses 126 (FIG. 10) are formed in the top of the pressure plate to accommodate the fastener assemblies 90 when the pressure plate is in its raised or clamping position.

Figure 11:
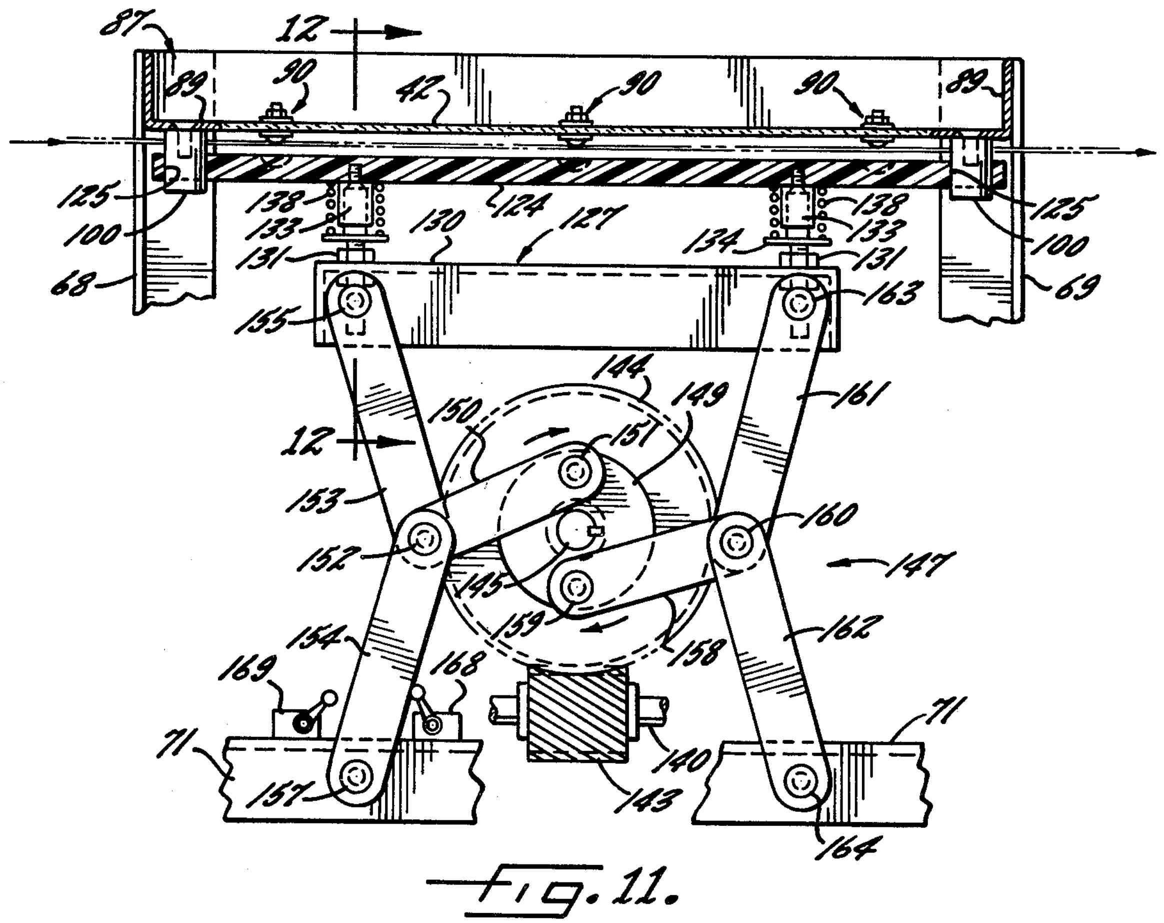
FIG. 11 is a fragmentary end view of the pre-exposing apparatus, parts being broken away and shown in section.
Figure 12:
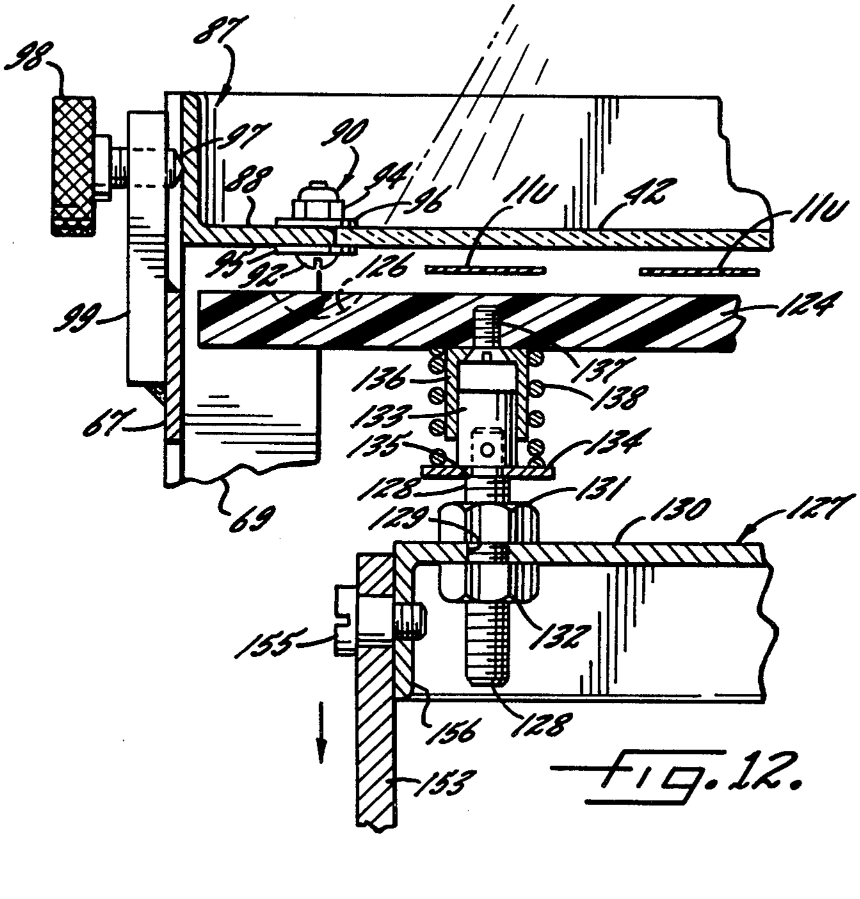
FIG. 12 is an enlarged fragmentary sectional view taken along the line 12—12 in FIG. 11.

As shown in FIGS. 4, 11 and 12, the pressure plate 124 is made of hard rubber or the like and is resiliently mounted on a rectangular frame 127 disposed beneath the pressure plate. Thus, threaded vertical pins 128 project through holes 129 in the top 130 of the frame and are rigidly fastened to the frame by nuts 131 and 132 threaded on the pins above and below the frame top 130. A sleeve 133 is received on and pinned to the reduced upper end portion of each pin and a radial flange 134 formed on the lower end of the sleeve abuts a shoulder 135 on the pin. Each sleeve 133 projects into and slides in a cylinder 136 fastened to the underside of the pressure plate 124 by a screw 137 and a coiled compression spring 138 encircles the cylinder and acts between the flange 134 and the pressure plate whereby the latter is resiliently supported on the frame 127 through the springs 138.

To move the frame 127 and hence the pressure plate 124 up and down, a reversible motor 139 (FIGS. 6, 7 and 11) is mounted on the transverse angle iron 72 of the base 66 with its output shaft 140 being horizontal and journaled in spaced bearings 141 which are secured to transverse angle irons 142 on the base 66. Keyed to the output shaft between the bearings is a worm 143 meshing with a worm gear 144 which is keyed to a horizontal transverse shaft 145. The latter is journaled in spaced bearings 146 which are bolted to the longitudinal angle irons 70 of the base. The shaft 145 moves the frame 127 up and down through two identical linkage systems 147, one at each end of the shaft.

Each linkage system 147 includes a hub 148 pinned to the shaft 145 (FIG. 6) and a circular disk 149 (FIGS. 7 and 11) is rigid with the hub. A crank 150 is pivotally connected at one end to the disk by a pin 151 which is offset forwardly of the center of the disk. At its outer end, the crank is pivotally connected at 152 to the ends of two links 153 and 154, the link 153 extending upwardly and being pivotally connected at its upper end at 155 to a downwardly turned peripheral flange 156 on the frame 127 while the link 154 extends downwardly and is pivotally at its lower end at 157 to the longitudinal angle irons 71 of the base 66. Similarly, a second crank 158 is pivotally connected at one end to the disk 149 by a pin 159 which is offset rearwardly from the center of the disk. Also, the outer end of the crank 158 is pivotally connected at 160 to the ends of two links 161 and 162 which, like the links 153 and 154, are respectively pivotally connected at 163 and 164 to the frame flange 156 and the angle iron 71.

When the motor 139 is driven to turn the disk 149 clockwise as viewed in FIG. 11, the inner pivot points 151 and 159 of the cranks 150 and 158 turn respectively to positions above and below the center of the disk. This moves the pivots 152 and 160 toward each other so that the links 153, 154, 161 and 162 lower the frame 127 and hence the pressure plate 124 which then is in its lowermost position, the motor 139 then being stopped through the control 48 by the link 154 engaging a limit switch 168. This is the position of these parts while the control strip 45 and the film 11U are being advanced. Upon completion of the advance and the initiation of the pre-exposing cycle by the control 48, the motor 139 is driven in the reverse direction to turn the disk counterclockwise and move the pivots 152 and 160 outwardly until the link 154 engages a limit switch 169 to stop the motor at which time all the links are vertical as shown in FIG. 7. In this position of the links, the frame 127 is in its uppermost position. As the frame approaches this position, the pressure plate 124 first engages the control strip and the film strips and begins to press the strips against the underside of the plate 42. During its final upward movement, the frame compresses the springs 138 which hold the pressure plate 124 firmly against the strips.

Figure 13:
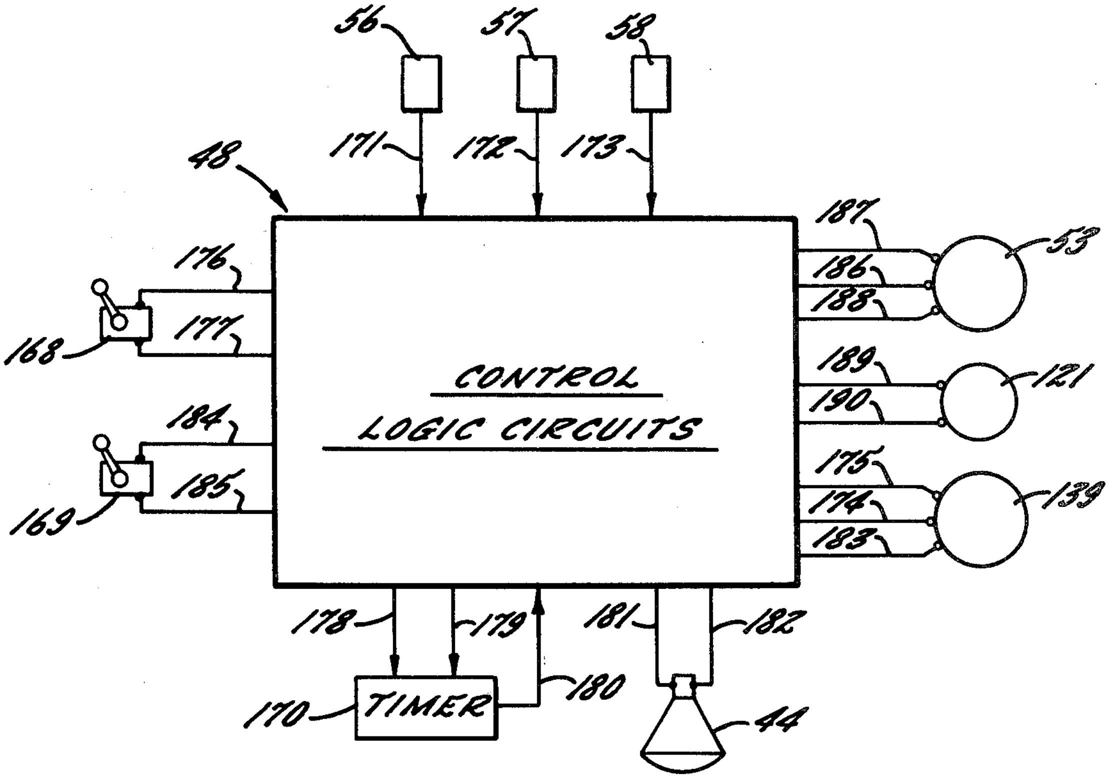
FIG. 13 is a schematic drawing of the control system for the pre-exposing apparatus.

A hood 165 (FIG. 4) encloses the principal mechanisms of the pre-exposing apparatus and rests on brackets 166 rigidly attached to the legs 68 and 69 of the base. The light source 44 is a lamp disposed within and secured to the top of the hood and, preferably, it is of the type known as a pinpoint source lamp such as is commonly used in photographic engraving. Such lamps have a selectively adjustable intensity and the darkness of the indicia lines 22 through 25 on the developed film depends on the selected intensity and the selected length of exposure as controlled by a timer 170 (FIG. 13). An exposure for five and three-quarters seconds at medium intensity has been found to be suitable. To direct the light from the lamp 44 only onto the plate 42, a pyramid shaped shade 167, which also is attached to the top of the hood, surrounds the lamp and projects down toward the edges of the plate.

The logic circuits of the control 48 may be of any of the various types well-known in the control art and the specific circuits form no part of the present invention. For the present purpose, it is sufficient to understand that, as shown schematically in FIG. 13, the output signals of the photoelectric cells 56, 57 and 58 are fed to the control as indicated by the arrows 171, 172 and 173 respectively. If it is assumed that a cycle begins after a complete advance of the film 11U and of the control strip 45, one pair of targets 65, 46 will be alined with the cells 57 and 58 and both cells are energized. With the simultaneous signals from these two cells, the control first drives the clamping motor 139 in the clamping direction through the lines 174 and 175 until the motor is stopped by the limit switch 168 which is connected to the control by lines 176 and 177. At this time, the control starts the timer 170, the two being connected by lines 178 and 179. As indicated by the arrow 180, the timer operates through the control to energize the lamp 44 which is connected to the control by lines 181 and 182. When the timer times out, the control deenergizes the lamp, resets the timer and starts the motor 139 in the reverse direction through the lines 174 and 183 and this motor runs until it is stopped by the limit switch 168 which is connected to the control by lines 184 and 185. Next, the control causes the motor 53 to start and operate at its fast speed through the lines 186 and 187 and this advances the film and control strips until the next target 46 energizes the photoelectric cell 56. In response to the signal from this cell, the control operates through the lines 186 and 188 to cause the motor 53 to run at its slower speed in advancing the strips. This continues until the target 46 reaches the photoelectric cell 57 at which time the control receives a signal only from this cell. In this condition, the control de-energizes the motor 53 and, through the lines 189 and 190, energizes the motor 121 which swings the arm 55 (FIG. 4) to advance the strips at a very slow rate until the target 46 reaches the cell 58, the signal from which is effective to stop the motor 121. At the same time the associated target 65 is at the cell 57 so that again there are simultaneous signals from the cells 57 and 58 and the cycle is repeated.

In use, a supply roll 49 of the control strip 45 and one or more supply rolls 11F of unexposed film 11U are mounted on the shaft 50 and strips from these rolls are threaded under the dancer rollers 102, between the rollers 103 and 104, through the spaces between the front guide rolls 100, under the plate 42, through the spaces between the rear guide rolls 100, between the rollers 103' and 104' and onto the take-up rolls 51 and 11R. At this time, the pressure plate 124 is in its lower position shown in FIG. 11. The automatic operation of the pre-exposing apparatus is started and the initial action is the energization of the drive motor 53 at its higher speed. This turns the shaft 52 to advance the control strip 45 and the strips of film 11U relatively rapidly and in unison until the photoelectric cell 56 senses a hole 46 in the control strip. The cell 56 then causes the drive motor to change to its lower speed whereby the strips advance slowly until the hole 46 is sensed by the photoelectric cell 57. The latter stops the drive motor, although the strips advance a slight distance further due to inertia, and energizes the motor 121 for the compensating arm 55. The arm turns the shaft 52 at a very low speed with a correspondingly slow advance of the strips until the hole 46 is sensed by the third photoelectric cell 58 which stops the motor 121 and the arm 55 after all the strips have advanced exactly the distance l.

When the hole 46 is alined with the photoelectric cell 58, the trailing hole 65 in the control strip 45 also is alined with the photoelectric cell 57 and these two cells coact to initiate the pre-exposing cycle as effected by the control 48. Thus, first the motor 139 is energized in a direction to turn the disk 149 counterclockwise and raise the pressure plate 124 to its upper position in which it clamps the control strip 45 and the strips of film 11U against the plate 42. Next, the lamp 44 is energized to expose the film to the indicia lines on the plate and, when the timer 170 for the lamp times out after the preselected exposure time, the motor 139 is reversed to lower the pressure plate. Finally, the motor 121 is reversed to return the compensating arm 55 to its original position and the drive motor 53 is energized again at its higher speed to begin a new cycle. All of this is repeated until the unexposed film on the supply rolls 11F has been pre-exposed and wound on the take-up rolls 11R.

Each take-up roll 11R of film is a supply roll of pre-exposed film to be packaged in an automatic packaging machine such as the one illustrated schematically in FIG. 1. Thus, one such roll is mounted in the packaging machine along with supply rolls 12R and 13R of black insert material, a supply roll 14R of lead sheet material and supply rolls 15R and 16R of cover sheet material and material is drawn off these supply rolls to form the ultimate X-ray package such as the dental X-ray package 10 shown in FIG. 2.

I claim:

1. An X-ray film package for applying dimensional indicia on the developed X-ray film, said package comprising, a sheet of X-ray film having pre-exposed but undeveloped dimensional indicia thereon, and a cover completely enclosing said film, said cover being formed of material which protects said film from normal light but which is penetrated by X-radiation whereby, when the package is placed adjacent an object and subjected to X-radiation and the film thereafter is developed, both the object and said dimensional indicia appear on said film with the dimensional indicia being black on the developed film.

2. An X-ray film package as defined in claim 1 including a lead sheet lying against one side of said sheet of film and two opaque sheets with the film and lead sheets sandwiched between the opaque sheets, all of said sheets being of substantially the same size and all being enclosed by said cover.

3. The method of making an X-ray film package, said method comprising the steps of, exposing an X-ray film only to dimensional indicia without either further exposing or developing the film, the exposure being through a plate which is opaque except for the dimensional indicia, and placing said film in a cover which completely encloses the film and protects the film from normal light, at least one side of said cover being penetrable by X-radiation whereby, when said package is placed adjacent an object and subjected to X-radiation and when thereafter the film is developed, the image on the film includes both the object and said dimensional indicia with the indicia being black on the developed film.

4. The method of making an X-ray film package, said method comprising the steps of, unwinding a strip of unexposed X-ray film from a supply roll along one side of a plate which is opaque except for dimensional indicia and advancing the film along said plate intermittently in steps of precisely the same length, between each advance of the strip exposing the portion of the strip adjacent said plate to a light source on the other side of the plate thereby to pre-expose that portion of the strip to said indicia, progressively rewinding said strip after it has been pre-exposed to produce a roll of pre-exposed but undeveloped film, unwinding said roll of pre-exposed film while simultaneously winding strips of cover material from supply rolls of such material to form a composite strip of film and cover material with cover material on both sides of the film, and forming X-ray packages successively from the end of said composite strip whereby, when each such package is placed adjacent an object and when thereafter the film is developed, the image on the film includes both the object and said dimensional indicia.

5. Apparatus for pre-exposing a strip of X-ray film to dimensional indicia, said apparatus comprising, drive means for advancing a strip of unexposed X-ray film step by step through a position in which successive portions of predetermined length are disposed at said position, light means operable to expose each such length when disposed at said position to dimensional indicia, a control strip having a plurality of targets formed along its length with the space between adjacent targets being precisely correlated with said predetermined length, said drive means advancing said control strip in synchronism with said strip of film, sensing means disposed along said control strip and activated each time it senses one of said targets, and control means responsive to said sensing means and operable when said sensing means is activated first to stop said drive means thereby to stop the advance of said strips, then to operate said light means and then to restart said drive means.

6. Apparatus as defined in claim 5 in which said control strip is separate from said strip of film whereby the control strip may be reused to control the pre-exposing of successive strips of film.

7. Apparatus as defined in claim 5 in which said drive means advances in unison a plurality of strips of X-ray film and said light means being operable simultaneously to expose equal lengths of all the strips of film to said dimensional indicia.

8. Apparatus for pre-exposing a strip of X-ray film to dimensional indicia, said apparatus comprising, drive means for advancing a strip of unexposed X-ray film step by step through a position in which successive portions of predetermined length are disposed at said position, light means operable to expose each such length when disposed at said position to dimensional indicia, a control strip having a plurality of first targets formed along its length with the space between adjacent targets being precisely correlated with said predetermined length and a plurality of second targets, each of said second targets being spaced a predetermined distance behind one of said first targets, said drive means advancing said control strip in synchronism with said strip of film and operable to advance the strips at a high speed, an intermediate speed and a slow speed, sensing means including first, second and third sensors successively disposed along said control strip to sense in order each of said first targets, and control means responsive to said sensors and controlling said drive means to change the advance of said strips from high speed to intermittent speed when said first sensor senses one of said first targets, then changes the advance when said second sensor senses said first target and stops the advance when said third sensor senses said first target, the spacing between said second and said third sensor being equal to said predetermined distance whereby said second sensor senses the associated one of said second targets when said third sensor senses said first target, said control means being responsive to said second and third sensors sensing respectively said second and first targets first to operate said light means and then to restart said drive means to advance the strips at high speed.

9. Apparatus as defined in claim 8 in which said drive means includes a two-speed motor to advance said strips at the high and intermediate speeds and an auxiliary drive mechanism operable when energized to advance the strips at the low speed, said control means (a) being responsive to said first sensor sensing a first target to change said motor from its higher speed to its lower speed, (b) being responsive to said second sensor sensing said first target to stop said motor and start said auxiliary drive mechanism, and (c) being responsive to said third sensor sensing said first target to de-energize said auxiliary drive mechanism.

10. Apparatus for pre-exposing X-ray film to dimensional indicia, said apparatus comprising, a base, a plate having a portion of predetermined length which is opaque except for dimensional indicia, a first shaft mounted on said base adjacent one end of said plate, a second shaft mounted on said base adjacent the other end of said plate, a control strip initially wound on a first supply roll mounted on said first shaft, a first take-up roll mounted on said second shaft, said control strip extending from said first supply roll and along one side of said plate to said first take-up roll, a strip of unexposed X-ray film initially wound as a second supply roll mounted on said first shaft, a second take-up roll mounted on said second shaft, said film strip extending from said second supply roll and along said one side of said plate to said second take-up roll, said film strip being parallel to said control strip and passing along said opaque portion of said plate, a lamp mounted on said base on the other side of said plate and operable when energized to expose the portion of said film strip adjacent to said opaque portion to said dimensional indicia, power operated means for turning said second shaft and operable when energized to drive said second shaft thereby to advance said control strip and said film strip in unison from their respective supply rolls to their respective take-up rolls, a plurality of targets formed along said control strip with the space between adjacent targets being equal to said predetermined length, sensing means disposed along said control strip and activated each time it senses one of said targets, and control means responsive to said sensing means and operable when said sensing means is activated to de-energize said power operated means, then to energize and de-energize said lamp and then to re-energize said power operated means.

11. Apparatus as defined in claim 10 including means for clamping and unclamping said strips against said one side of said plate, said control means controlling said clamping means to clamp the strips against the plate after said power operated means has been de-energized and then to unclamp the strips after said lamp has been de-energized.

* * * * *